Dec. 11, 1962 R. B. BLAND ET AL 3,067,594
COOLING WITH ENDOTHERMIC CHEMICAL REACTIONS
Filed May 11, 1959
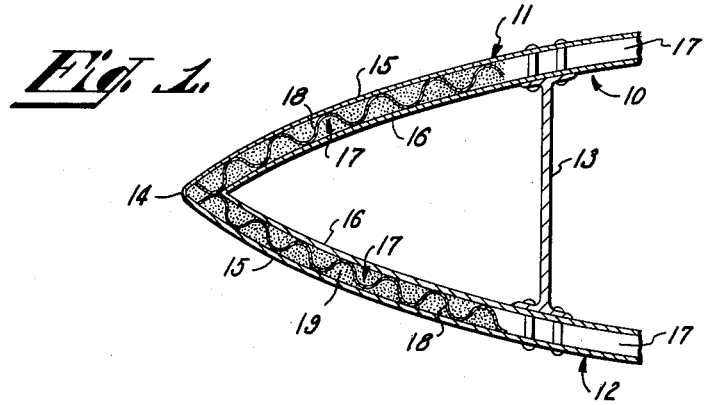
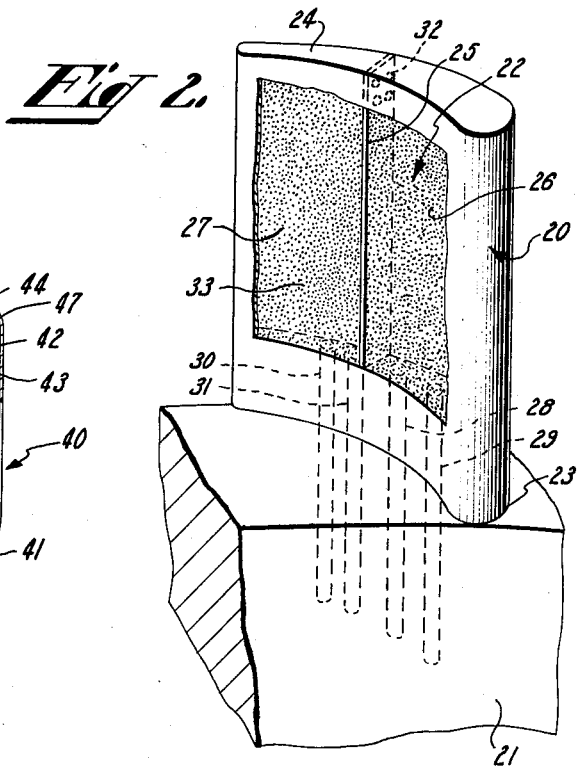
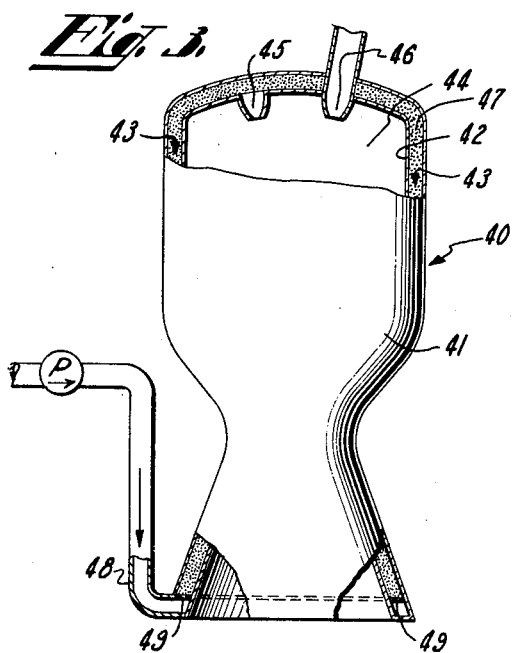
INVENTORS
REGINALD B. BLAND
BY FREDERICK J. EWING
Christie, Parker & Hale
ATTORNEYS

3,067,594
COOLING WITH ENDOTHERMIC CHEMICAL REACTIONS
Reginald B. Bland, Laguna Beach, and Frederick J. Ewing, Altadena, Calif., assignors, by direct and mesne assignments, to The Catacycle Company, Beverly Hills, Calif., a corporation of California
Filed May 11, 1959, Ser. No. 812,327
26 Claims. (Cl. 62—4)

This invention relates to a method and structure for the absorption of heat and particularly to a method and structure in which the removal of heat necessary to maintain a member at a safe operating temperature is accomplished by a chemical substance adapted to undergo an endothermic chemical reaction.

In many operations, in order to maintain a surface of a structure at a safe operating temperature, there exists a need to remove large amounts of external heat, frequently within relatively short intervals of time. The safe operating temperature as used herein refers to a temperature at which the structural characteristics of a member made of a particular material are not destructively affected by thermal effects. Complete collapse of a structure will occur when the temperature of a metal reaches its melting point or the temperature of an amorphous material reaches its softening point. In addition, however, temperatures even below the melting point of a metal can be sufficient to cause creep failure of a structure.

While these problems are present to varying degrees in many operations and applications, the problem of removing large quantities of heat is particularly faced in missile and aeronautical applications. For example, in flight, leading edges of wings and other surfaces are subjected to aerodynamic heating involving both compression and fluid friction heating. The problem of aerodynamic heating increases with increasing speeds and is present even at high altitudes in rarified air. Rocket motors and nozzles and turbine blades in jet engines are other examples of structures subjected to intense heat. The limitations of weight and materials present in missile and aeronautical applications cause the thermal problems presented to assume paramount and frequently critical importance.

Our invention is utilizable in a structure requiring the removal of heat to maintain a surface at a safe operating temperature and comprises in combination a surface to be cooled and at least one chemical substance disposed in heat transfer relationship with said surface and adapted to react endothermically at a temperature below the safe operating temperature of the surface to absorb sufficient quantities of heat to maintain said surface at its safe operating temperature. While it is not exclusively the case, endothermic reactions for most substances proceed at a rate sufficient to absorb the quantity of heat required to be absorbed in many applications only in the presence of a catalyst. Accordingly, as one aspect of our invention, it is required that a catalytic substance be disposed relative to the reacting chemical substance to control the rate of endothermic reaction.

It is recognized that in the field of chemical and petroleum processing there are many processes in which one step of the process involves either an endothermic or exothermic chemical reaction. In these processes, heat exchanging means are provided so that the particular process problem of either heat intake or heat release is met. Such heat exchanging means conventionally includes a surface having a high rate of thermal conductivity interposed between the zone of chemical reaction and a medium which either absorbs or gives up heat to the chemical reactance. However, to our knowledge, a chemical substance adapted to undergo an endothermic chemical reaction has not previously been disposed in heat transfer relationship to a surface so as to maintain the surface itself at a safe operating temperature. In the apparatus of our invention the endothermic reaction is specifically employed to cool the surface so that certain criteria are imposed upon the selection of the chemical substance adapted to undergo the endothermic reaction. In contrast, in the case of chemical processes involving exothermic or endothermic reactions, the intrinsic quality of the reaction is merely compensated for by appropriate heat exchanging means.

In one embodiment of our invention the surface to be cooled is the leading edge of a device in flight and subject to aerodynamic heating. A chemical substance adapted to react endothermically is disposed in heat transfer relationship to said leading edge. Such surfaces may be the leading edge of a wing, the vertical and horizontal tail surfaces or the nose portion of the fuselage. The embodiment is particularly applicable for devices in supersonic flight, including those devices which re-enter the earth's atmosphere after space flight.

In another embodiment of our invention the surface to be cooled is the surface of a turbine blade exposed to a zone of high temperature. A chemical substance is disposed within an internal cavity of the blade to be in heat transfer relationship with said surface and thereby to maintain the surface at a safe operating temperature.

In still another embodiment of our invention, the surface to be cooled is the inner surface of a rocket motor. A chemical substance is disposed in heat transfer relationship to said inner surface so as to maintain the surface at a safe operating temperature.

In each of these embodiments, the utilization of a chemical substance adapted to undergo an endothermic reaction to cool said surfaces prevents structural failure of such surfaces due to thermal effects and in many applications results in considerable savings in material weight and costs by enabling, because of the effective cooling obtained, the use of more commonplace and readily-available materials.

In a further embodiment of our invention the surface to be cooled is in a device including a fuel burning engine. A chemical substance is disposed in heat transfer relationship to the surface to be cooled. The chemical substance is adapted to react endothermically to absorb sufficient quantities of heat to maintain the surface at its safe operating temperature and further to yield at least one reaction product which is combustible as a fuel in the engine. Means are provided for conducting the reaction product to the engine. Our invention also encompasses the method whereby an endothermic reaction is caused to occur to cool a surface and to yield reaction products having a higher heat of combustion than the initial reactants. As a second step of the process, the reaction products are conducted to a fuel burning engine.

In the embodiment described in the next preceding paragraph, the thermal energy absorbed in the endothermic reaction of particular chemical substances can result in reaction products having a higher heat of combustion than the initial reactants. In such cases, therefore, not only is the surface maintained at a safe operating temperature but thermal energy otherwise dissipated is utilized to improve the heat of combustion of the fuel furnished to the fuel burning engine.

In the selection of substances suitable for the present invention it is required that the substance be capable of an endothermic reaction at a temperature below the safe operating temperature of the surface to be cooled and that the heat intake of the reaction provide sufficient heat absorption to keep the temperature of said surface below its safe operating temperature under the operating conditions. The heat intake of the reaction should therefore be high at the operating temperature. To determine whether the reaction will occur at such operating temperature the equilibrium constant, K, for the particular reaction at such temperature should be determined. The plot of $R \ln K$ or $4.5787 \log_{10} K$ against $1/T$ gives a curve whose slope is $-\Delta H$, or $-\Delta F$ for the case where the change in entropy is zero. The symbols used above are:

$R$ = Gas law constant
$K$ = Equilibrium constant for the particular reaction
$T$ = Temperature in degrees Kelvin
$\Delta F$ = Free energy of the reaction
$\Delta H$ = Heat of reaction If at the desired operating temperature, the value of $\log_{10} K = 0$, the reaction is possibly suitable. If the value of $\log_{10} K = +4$ or more, the suitability of the reaction is likely.

There are a number of organic and inorganic chemical substances which react endothermically at a temperature suitable to protect metallic structures. For example, among organic chemical reactions having a suitable heat intake and equilibrium constant at elevated temperatures are: the dehydrogenation of cyclohexane to yield benzene and hydrogen; the dehydrogenation of ethane to yield ethylene and hydrogen; the dehydrogenation of ethane to yield acetylene and hydrogen; the dehydration of ethanol to yield ethylene and water; and the dehydrogenation of methanol to yield formaldehyde and hydrogen. More generally, reactions which result in the removal of a hydrogen atom from paraffinic hydrocarbons or reactions which result in the removal of three hydrogen atoms from cyclic hydrocarbons are endothermic so that hydrocarbon fuels, and particularly jet fuels, may be adopted for endothermic reaction at certain temperatures.

Among the inorganic chemical reactions having suitable heat intakes and equilibrium constants at temperatures below the safe operating temperatures of many materials are: the dissociation of ammonia to yield nitrogen and hydrogen; the dissociation of nitrogen tetraoxide into nitrogen dioxide; the synthesis of carbon disulfide, hydrogen cyanide, hydrogen iodide, nitrogen dioxide and nitrous oxide.

Where heats of reaction are not specifically available for a particular chemical substance, it is possible to calculate the approximate heat of reaction from the bond energies of the bonds entering into the reaction of the substances involved. In this manner, the advisability of further examination of the thermodynamic data for the particular reaction can be readily established. It is preferred that the heat intake of the reaction be at least 10 kilogram-calories per mol of reactant at the operating temperature at which the reaction is intended to occur.

In general, the reactions enumerated above proceed at a suitable rate and temperature only in the presence of a catalyst. In some instances, the catalyst itself will control the temperature at which the reaction proceeds at a satisfactory rate. For example, in the dehydrogenation of cyclohexane, the reaction proceeds at about 300° C. over a platinum metal or nickel metal catalyst. The reaction proceeds at about 450° C. over a chromium oxide catalyst. The reaction proceeds at about 475° C. over a tungsten sulfide or nickel sulfide catalyst.

Some reactions proceed at a rate satisfactory according to the present invention in the absence of a catalyst. For example, in the dehydrogenation of $C_2$ hydrocarbons, no particular advantage is gained through the use of catalysts at high temperatures. Similarly, among inorganic materials, the dissociation of nitrogen tetraoxide requires no catalyst. Such reactions can offer important advantages since the space requirements in which the endothermic reaction takes place for cooling a surface are reduced in volume and marked savings in weight are achieved.

Where, as another embodiment of our invention, the endothermic reaction is utilized not only to maintain a surface below its safe operating temperature but further to yield a reaction product suitable for use in a fuel burning engine, the basic requirements for selection are the same as set forth above. In addition, however, the selection is made on the basis of a reaction product suitable as a fuel. A wide range of materials produced as reaction products of endothermic reactions are utilizable as fuels including aromatic hydrocarbons such as benzene, amines, aldehydes, alcohols, ketones and hydrogen as well as other inorganic substances.

It will be apparent to one skilled in the art that there are a large number of organic and inorganic reactions which may be suitably employed to practice our invention. Since we have disclosed the concept of disposing a chemical substance adapted to undergo an endothermic reation in heat transfer relationship with a surface to be cooled and have set forth the basic considerations applicable in the selection of said chemical substance, one skilled in the art can apply the proper thermodynamic data for a particular substance and establish its applicability. Accordingly, we do not intend that the practice of our invention be limited to those organic and inorganic reactions set forth above as examples. However, to illustrate further the applicable considerations, we have set forth below appropriate thermodynamic data for three specific reactions suitable in the practice of the invention. These data will serve to demonstrate how the suitability of a particular reaction at various temperatures may be determined.

The dehydrogenation of cyclohexane to yield benzene and hydrogen occurs by the following reaction:

(1) $\qquad C_6H_{12} \rightarrow C_6H_6 + 3H_2$

At high temperatures, the following thermodynamic data are applicable for this reaction:

*Table I*

| Temperature | | Kilogram-Calories per mol | | Equilibrium constant K |
|---|---|---|---|---|
| ° C. | ° K. | ΔH | ΔF | |
| 227 | 500 | 51.62 | +5.17 | 5.51×10⁻³ |
| 327 | 600 | 52.28 | −4.20 | 3.37×10¹ |
| 427 | 700 | 52.63 | −13.64 | 1.81×10⁴ |
| 527 | 800 | 52.70 | −23.12 | 2.07×10⁶ |
| 627 | 900 | 52.56 | −32.59 | 8.20×10⁷ |
| 727 | 1,000 | 52.23 | −42.03 | 1.53×10⁹ |
| 827 | 1,100 | 51.77 | −51.40 | 1.63×10¹⁰ |
| 927 | 1,200 | 51.20 | −60.79 | 1.13×10¹¹ | where
$\Delta H$ = heat of reaction
$\Delta F$ = free energy change of the reaction
$K$ = equilibrium constant It is seen that the heat of reaction ($\Delta H$) is positive at all of the temperatures considered, revealing that the reaction proceeds endothermically. It is further seen that the free energy change of the reaction, determined by the difference between the free energy of the products of the reaction and the free energy of the reactant(s), is positive at 500° K. and negative at 600° K. Therefore, the reaction will not proceed at 500° K. but is possible at 600° K. This shows that at a temperature of 327° C. (600° K.), well below the safe operating temperature for many metals and other materials, the reaction will proceed in the direction of producing one mol benzene and three mols hydrogen.

Since the heat content is in terms of kilogram-calories per mol of reactant, the degree of completion of the reaction at equilibrium will affect the total kilogram-calories of heat absorbed. Treated as an ideal gas, the equilibrium constant for the reaction of cyclohexane is as follows:

$$K = \frac{(P_{C_6H_6})(P_{H_2})^3}{(P_{C_6H_{12}})}$$

where $P$=partial pressure of the reactants and reaction products. (For conditions where the gas behaves non-ideally, i.e. the fugacity rule applies, the appropriate activity coefficient is utilized with the partial pressure and mol fraction of each compound present in the reaction.) From the equilibrium constant data presented above, the equilibrium degree of completion at a particular temperature may be readily computed and the total heat absorbed at this point may be established.

The utility of the dehydrogenation of cyclohexane for absorption of heat as set forth above may be realized when compared to the absorption of heat accompanying the change of state of water from liquid to gas. This phase change, which is commonly used as one of the most efficient cooling systems, is accompanied by the absorption of 10.52 kilogram-calories per mol. On a weight basis this becomes 0.584 kilogram-calories per gram. In comparison at 600° K. the dehydrogenation of cyclohexane results in the absorption of 52.281 kilogram-calories per mol of reactant gas and 13.067 kilogram-calories per mol of product gas. On a weight basis 0.622 kilogram-calories per gram are absorbed. These data demonstrate the advantages which may be derived from the use of the endothermic reactions of the present invention.

The dehydrogenation of cyclohexane also results in two combustible reaction products, namely, benzene and hydrogen having in combination a heat of combustion substantially higher than the heat of combustion of the initial reactant. Cyclohexane is therefore illustrative of a chemical substance utilizable to produce fuel products.

The dehydrogenation of ethane to yield ethylene and hydrogen and the dehydrogenation of ethane to yield acetylene and hydrogen proceeds by reactions (2) and (3) respectively:

(2) $C_2H_6 \rightarrow C_2H_4 + H_2$ (3) $C_2H_6 \rightarrow C_2H_2 + 2H_2$

In Table II below, the $\Delta H$, $\Delta F$ and K data for the dehydrogenation of ethane ot produce ethylene and hydrogen are provided. In Table IIa, the equilibrium degree of completion and the calculated total heat absorption under pressures of 10, 1 and 0.1 atmospheres are provided for the dehydrogenation of ethane to produce ethylene and hydrogen at the temperatures for which the $\Delta H$, $\Delta F$ and K data of Table II are provided.

*Table II*

| Temperature | | Kilogram-Calories per mol | | Equilibrium constant K |
|---|---|---|---|---|
| °C. | °K. | ΔH | ΔF | |
| 627 | 900 | 34.42 | +5.35 | 5.0×10⁻² |
| 727 | 1,000 | 34.43 | +2.12 | 0.34 |
| 827 | 1,100 | 34.52 | −1.12 | 1.67 |
| 927 | 1,200 | 34.52 | −4.36 | 6.22 |
| 1,027 | 1,300 | 34.53 | −7.59 | 18.91 |
| 1,127 | 1,400 | 34.42 | −10.82 | 48.9 |

*Table IIa*

| Temperature | | Equilibrium degree of completion (C)-Percentile | | | Total heat absorbed—CΔH | | |
|---|---|---|---|---|---|---|---|
| °C. | °K. | 10 atm. | 1 atm. | 0.1 atm. | 10 atm. | 1 atm. | 0.1 atm. |
| 627 | 900 | ---- | 21.8 | 57.8 | ---- | 7.50 | 19.89 |
| 727 | 1,000 | 18.2 | 50.6 | 88.0 | 6.28 | 17.45 | 30.35 |
| 827 | 1,100 | 37.7 | 79.1 | 97.1 | 13.01 | 27.31 | 33.52 |
| 927 | 1,200 | 61.9 | 92.7 | 99.2 | 21.37 | 32.00 | 34.24 |
| 1,027 | 1,300 | 80.8 | 97.5 | 99.8 | 27.86 | 33.62 | 34.41 |
| 1,127 | 1,400 | 91.2 | 99.0 | 99.9 | 31.39 | 34.07 | 34.39 |

In Tables III and IIIa below, the comparable data for the dehydrogenation of ethane to yield acetylene and hydrogen are provided.

*Table III*

| Temperature | | Kilogram-Calories per mol | | Equilibrium constant K |
|---|---|---|---|---|
| °C. | °K. | ΔH | ΔF | |
| 927 | 1,200 | 78.64 | +1.64 | 0.5 |
| 1,027 | 1,300 | 78.57 | −4.77 | 6.3 |
| 1,127 | 1,400 | 78.45 | −11.17 | 55.4 |
| 1,227 | 1,500 | 78.28 | −17.53 | 364.0 |

*Table IIIa*

| Temperature | | Equilibrium degree of completion (C)-Percentile | | | Total heat absorbed—CΔH | | |
|---|---|---|---|---|---|---|---|
| °C. | °K. | 10 atm. | 1 atm. | 0.1 atm. | 10 atm. | 1 atm. | 0.1 atm. |
| 927 | 1,200 | 11.8 | 62.5 | 99.2 | 9.23 | 49.15 | 78.01 |
| 1,037 | 1,300 | 30.5 | 93.7 | 99.9 | 23.96 | 73.62 | 78.49 |
| 1,127 | 1,400 | 63.5 | 99.3 | 100.0 | 49.81 | 77.90 | 78.44 |
| 1,227 | 1,500 | 89.5 | 99.9 | 100.0 | 70.06 | 78.20 | 78.27 |

The data set forth in Tables II, IIa, III and IIIa are analyzed to determine the applicability of the particular reaction for the particular application in the same manner as described with reference to the cyclohexane reaction.

From the foregoing specific data, a basis is set forth by which one skilled in the art may apply thermodynamic data to determine the utility of a particular endothermic reaction in the structure of the present invention. It is not possible, however, from thermodynamic data to predict the reaction rate, a factor which enters into the effectiveness of the heat absorption. From general considerations, however, it is known that the velocity at which a reaction proceeds may be increased by an increase in temperature, an increase in pressure, provision of a positive catalyst or agitation of the reacting system. Any of these changes will increase the rate at which a reacting system approaches equilibrium and will tend to increase the actual degree of completion attained in any given time. For an endothermic reaction, it is clear that an increase in temperature will increase the rate of reaction. Where the reaction proceeds with an increase in the number of mols an increase in pressure will increase the rate of reaction but, as demonstrated by the data in Table III above, will decrease the equilibrium degree of completion.

The term "exothermic fluid" as used in this specification and in the claims, means a substance, consisting of one or more elements and/or compounds, in liquid and/or vapor phases, which is formed with liberation of heat (negative heat of reaction) as a result of an exothermic reaction. The term "endothermic fluid" means a substance consisting of one or more elements and/or compounds, in liquid and/or vapor phases, which is formed with the absorption of heat (positive heat of reaction) as a result of an endothermic reaction. The exothermic fluid absorbs heat in being converted to an endothermic fluid in an endothermic reaction. The endothermic fluid liberates heat in being converted to an exothermic fluid in an exothermic reaction.

The advantages of the structure of the present invention together with the manner in which it is applied will be more readily appreciated from the following description made in conjunction with the accompanying drawings in which:

FIG. 1 is an elevational view in section of a fragmentary portion of a wing, showing particularly the leading edge of the wing;

FIG. 2 is a perspective view, partially sectioned, of a turbine blade mounted on a turbine hub; and FIG. 3 is an elevational view partially broken away and sectioned of a rocket motor, with a pump shown associated therewith in graphical symbols.

With reference to FIG. 1, the portion of a wing 10 for devices in flight generally defined as the leading edge of the wing is shown. The leading edge refers to that portion of the surface of a wing or other member which first contacts the air through which the wing passes and is that portion of the wing surface subjected to the greatest degree of aerodynamic heating. The wing is formed to have an upper portion generally indicated by the reference character 11 and a lower portion generally indicated by the reference character 12. A brace 13 disposed between the upper and lower portions of the wing and secured at opposite ends to each provides structural support. The upper portion and lower portion of the wing are formed to taper inwardly toward each other and meet at a forward edge 14 of the wing. The leading edge is defined by an outer skin 15 forming the outer surface of both the upper and lower portions of the wing. An inner skin 16 parallels the outer skin so as to define a continuous enclosure 17 between the inner and outer skins. Within enclosure 17, a baffle plate 18 having a plurality of corrugations is disposed so that the corrugations extend lengthwise with the wing. A granular catalyst 19 fills the spaces between the surfaces of the corrugations in the baffle plate.

The flow of the chemical substance (e.g. cyclohexane—an exothermic fluid) adapted to undergo an endothermic reaction is through the void spaces between the catalyst granules into the plane of the paper on which the drawing is presented. The flow of the chemical substance through the catalyst results in an endothermic reaction when aerodynamic heating of the leading edge causes the temperature of the chemical substance flowing through enclosure 17 to reach a level where the reaction proceeds endothermically.

While not shown, suitable pumping means can be supplied whereby the chemical substance is continuously circulated through the catalyst. Similarly, while not shown, distribution headers may be arranged with respect to the corrugations of the baffle plates so that the chemical substance passes along the length of the wing through spaces defined by one group of corrugations and returns along the length of the wing through spaces defined by another group of corrugations. No reaction occurs as the leading edge passes through air at speeds where the material of which the outer skin is formed is not affected by the resulting aerodynamic heating. This is because the chemical substance is selected so that the reaction proceeds endothermically only when a higher temperature is reached. There is in effect, therefore, a built-in control as to when the reaction occurs. The result of the endothermic reaction as it occurs is to cool the adjacent outer surface of the wing by absorbing heat produced by aerodynamic heating.

With respect to FIG. 2 a turbine blade 20 mounted on a turbine hub 21 is provided with a central cavity 22 extending from a point above a blade root 23 to a blade tip 24. The blade root refers to that portion of the blade joined to the hub and the blade tip refers to extremity of the blade farthest removed from the hub. A radial partition 25 divides cavity 22 into two separate compartments 26, 27. Inflow passages 28, 29, passing through the blade root and the turbine hub, connect compartment 26 to a source of a chemical substance (not shown). Outflow passages 30, 31, passing through the blade root and the turbine hub, connect compartment 27 to an outflow distribution system (not shown). The upper portion of partition 25 is provided with a plurality of holes 32 so that flow communication between compartment 26 and compartment 27 is provided. Each of the compartments is packed with a granular catalyst 33.

In operation, a chemical substance is forced through inflow passages 28, 29 to pass through the void spaces between the catalyst granules packed in compartment 26 and then through holes 32 into compartment 27. The chemical substance passes through the void spaces between the catalyst granules in compartment 27 and out through outflow passages 30, 31.

The turbine together with its blades is in an environment of intense heat as, for an example, within the exhaust stream of a jet engine. Heat is transmitted through the surfaces of the turbine blades to the catalyst and the chemical substance flowing within the turbine blades. This heat is absorbed by the endothermic nature of the reaction which the chemical substance undergoes while flowing within the turbine blades. As a result, the surface of the blade is cooled while the endothermic reaction takes place. As described with reference to the wing structure described in FIG. 1, the chemical substances flowing through the compartments of the turbine blade may be selected so that reaction with attendant cooling occurs only at some particular temperature level. Once this temperature level is reached, the surface of the turbine blade is cooled and maintained at a safe operating temperature by reason of absorption of heat as the chemical substance undergoes an endothermic reaction.

In the embodiment of our invention utilizable in turbines, each blade of the turbine can be formed with the structure described above. The flow system is arranged so that the outflow from one turbine blade passes through the inflow passages of the next succeeding turbine blade. Serial flow through all turbine blades therefore occurs. The chemical substance, the catalyst and the flow rate of the chemical substance are selected so that enough of the chemical substance undergoes an endothermic reaction in each of the blades to provide cooling of the blade surfaces.

With reference to FIG. 3 a rocket motor 40 has an outer casing surface 41 paralleled by an inner casing surface 42 so that an enclosure 43 is defined between the outer and inner surfaces. The inner surface defines a combustion chamber 44. A fuel nozzle 45 is fitted through the inner surface so that its inlet is connected to enclosure 43 and its outlet is within the combustion chamber. An oxidizer nozzle 46 is fitted through the outer and inner surfaces so that its inlet is joined to a feed line and its outlet is within the combustion chamber. The fuel nozzle and oxidizer nozzle are positioned within the combustion chamber so that the intimate mixing of the sprays from each occurs.

A granular catalyst 47 fills enclosure 43. A fuel feed line 48 is connected at one end to a source of fuel and encircles the base of the motor, the line 48 being connected to a pump P for pumping fuel through the line. It is connected through a plurality of apertures 49 to enclosure 43. The fuel is a chemical substance adapted to undergo an endothermic reaction in accordance with our invention. The fuel is pumped through fuel line 48 and apertures 49 so that the fuel passes through the void spaces between the catalyst granules. An endothermic reaction occurs when a predetermined temperature is reached as the fuel passes within the enclosure. The chemical substance is selected so that the reaction products are combustible. The reaction products are ejected through the fuel nozzle and burned as a fuel for the rocket motor. As a result of the endothermic reaction, the inner surface of the rocket motor is cooled. While the effect in this embodiment is to absorb heat from the combustion of fuel so that no net gain of heat results, the inner surface of the rocket motor is maintained at a safe operating temperature and may be made of a considerably lighter metal than would be possible in the absence of the cooling effect provided in the structure of our invention.

The embodiment of the present invention wherein a chemical substance adapted to undergo an endothermic reaction both to cool a surface and to yield as a reaction product a combustible substance useful as a fuel is demonstrated with reference to the rocket motor of FIG. 3. Such a chemical substance can also be used with respect to the turbine blades described with reference to FIG. 2. However, in each of these embodiments, the heat absorbed by the chemical substance undergoing its endothermic reaction is removed either from the combustion of fuel or the section of the jet engine in which the turbine is mounted. Therefore, while the intended cooling effect is attained, no net gain of heat results. However, with respect to the leading edges of surfaces such as wings, the thermal energy which is otherwise dissipated is absorbed during the endothermic reaction and remains available in the reaction products as increased heats of combustion. As a result, where the reaction products are combustible, a fuel having a higher heat of combustion than the initial reactant or reactants is obtained. An example is the dehydrogenation of cyclohexane.

The structure disclosed in FIG. 1 is applicable for use where one or more of the reaction products is a fuel. A suitable pumping and distribution system for flowing the reaction products from the wing structure to the engine in which the fuel is burned is provided in combination with the wing structure described. The practice of this embodiment of the invention therefore requires additionally that selection of chemical substances be made so that one of the reaction products is combustible.

While the endothermic reactions heretofore described normally take place in the gaseous state, the reactant or reactants may initially be present in the liquid state. As a result, in addition to the heat absorbed in the endothermic reaction, the sensible heat necessary to raise the reactant to its boiling point and the latent heat of vaporization are absorbed from the environment.

With reference to the embodiments described in FIGS. 1-3 a granular catalyst has been described. It is particularly desirable that the catalyst of a high heat conductivity be used. Accordingly, while a granular catalyst may be used, it is to be understood that catalysts in various forms can be utilized within the concept of our invention. For example, screens or sheets of platinum may be treated to have active catalytic surfaces and then bonded to the metallic surface which it is desired to maintain at a safe operating temperature. Similarly, various powdered metallic catalysts may be sintered under high pressure to form a porous material of substantial strength and heat conductivity. Such a sintered catalyst may be employed as part of the structure to be cooled or may be welded or sintered to the surface to be maintained at a safe operating temperature. Furthermore, the catalyst may be distributed within its enclosure in the form of a dust with particles of about 50 microns in diameter or may be disposed as pellets, spherical beads or granules. While the manner in which the catalyst is disposed relative to the surface to be cooled has an important bearing upon the effectiveness with which heat is removed from said surface, one skilled in the art will from our disclosure of the various ways in which catalysts may be disposed in the structure of our invention be enabled to employ a catalyst so as to effectively maintain a surface at its normal operating temperature.

It is to be further understood that the structures described with reference to FIGS. 1-3 are illustrative of structures to which the concept of our invention is applicable. The use of a chemical substance adapted to undergo an endothermic chemical reaction is not limited to the particular structures described but is also applicable to modifications of such structures. For example, the leading edge described with reference to FIG. 1 may be in a nose cone, the nose of a fuselage or various stabilizing surfaces in aeronautical applications. Similarly, the structure of the turbine blade may be modified in various ways so that effective cooling of the blade surface is achieved.

It is to be further understood that the structure of the present invention may be utilized in essentially low temperature applications. There are a number of chemical substances capable of undergoing endothermic reactions in which the amount of heat absorbed is relatively small compared to those described above. Such chemical substances may be employed for the cooling of brake linings, the cooling of electronic components and various other essentially low-temperature cooling applications.

The structure of the present invention provides a means for effective cooling of a wide variety of surfaces subjected to varying degrees of heat. By selection of the proper chemical substance, a structure is provided in which no cooling takes place until a certain predetermined temperature level is attained. Once such temperature level is attained, rapid removal of large quantities of heat can be effectually carried out so that the surface in contact with the chemical substance is maintained at its safe operating temperature.

We claim:

1. In a structure requiring the removal of heat to maintain a surface at a safe operating temperature, the combination comprising a surface to be cooled, at least one chemical substance disposed in heat transfer relationship with said surface and adapted to react endothermically at a temperature below the safe operating temperature, and a catalytic substance disposed with relation to the chemical substance to control the rate of endothermic reaction at a rate to absorb sufficient heat to maintain said surface at its safe operating temperature, said chemical substance being free of reacting substances in a concentration which would cause said chemical substance when heated to react exothermically.

2. In a structure requiring the removal of heat to maintain a surface at a safe operating temperature, the combination comprising a surface to be cooled, a catalytic substance disposed in heat transfer relationship with the surface to be cooled, a chemical substance adapted to react endothermically at a predetermined temperature below the safe operating temperature, said chemical substance being free of reacting substances in a concentration which would cause said chemical substance when heated to react exothermically, and means for flowing said chemical substance in heat transfer relationship with the catalytic substance and the surface to be cooled, said means being closed against entry of said reacting substances.

3. Apparatus in accordance with claim 2 wherein the chemical substance is ethane.

4. Apparatus in accordance with claim 2 wherein the chemical substance is cyclohexane.

5. Apparatus in accordance with claim 2 wherein the chemical substance is ethanol.

6. In a device for flight including leading surfaces subject to aerodynamic heating and requiring the removal of heat to maintain said surfaces at a safe operating temperature, the combination comprising a leading surface to be cooled, an inner skin disposed relative to the leading surface to define an enclosure, a catalytic substance within the enclosure in heat transfer relationship with the surface to be cooled, a chemical substance adapted to undergo an endothermic reaction at a temperature below the safe operating temperature, said chemical substance being free of reacting substances in a concentration which would cause said chemical substance when heated to react exothermically, and means for flowing the chemical substance through the enclosure in heat transfer relationship with the catalytic substance and the leading surface, said means being closed against entry of said reacting substances.

7. A turbine comprising a hub, a plurality of turbine blades radially disposed around the hub, each turbine blade including an outer surface exposed to a zone of high temperature and defining an internal cavity within the blade, a catalytic substance within each cavity in heat transfer relationship with said outer surface, a chemical substance adapted to react endothermically, said chemical substance being free of reacting substances in a concentration which would cause said chemical substance when heated to react exothermically, flow passages interconnecting the cavities of the blades, and means for serially flowing the chemical substance through said flow passages and cavities in heat transfer relationship with the catalytic substance and outer surface of each of the blades, said flow passages and cavities being closed against entry of any of said reacting substances.

8. A structure comprising a fuel burning engine, a surface requiring the removal of heat to maintain said surface at a safe operating temperature, at least one chemical substance adapted to react endothermically at a temperature below the safe operating temperature to absorb a sufficient quantity of heat to maintain said surface at its safe operating temperature and to yield a combustible reaction product, said chemical substance being free of reacting substances in a concentration which would cause said chemical substance when heated to react exothermically, means for flowing the chemical substance in heat transfer relationship with said surface, said means being closed against entry of said reacting substances, and means for conducting the reaction product to the fuel burning engine.

9. In a device for flight including a fuel burning engine and leading surfaces subject to aerodynamic heating and requiring the removal of heat to maintain said surfaces at a safe operating temperature, the combination comprising a leading surface to be cooled, an inner skin disposed relative to the leading surface to define an enclosure, a catalytic substance within the enclosure in heat transfer relationship with the surface to be cooled, a chemical substance adapted to react endothermically at a temperature below the safe operating temperature to absorb a sufficient quantity of heat to maintain said surface at its safe operating temperature and to yield a combustible reaction product, said chemical substance being free of reacting substances in a concentration which would cause said chemical substance when heated to react exothermically, means for flowing the chemical substance through the enclosure in heat transfer relationship with the catalytic substance and the leading surface, said means being closed against entry of said reacting substances, and means for conducting the reaction product to the fuel burning engine.

10. A process for improving in flight the heat of combustion of fuels in devices in flight comprising the steps of passing a chemical substance adapted to undergo an endothermic reaction and to yield a combustible reaction product in heat transfer relationship with a surface subject to external heating, heating said chemical substance while maintaining said chemical substance inert to exothermic reaction thereof, thereby to produce a combustible reaction product, and conducting said reaction product to a fuel burning engine in the device in flight.

11. Process in accordance with claim 10 wherein the chemical substance is passed in heat transfer relationship with a leading surface of the device in flight subject to aerodynamic heating.

12. A method for withdrawing heat from a heated surface, comprising the steps of passing an exothermic fluid from an upstream region of a flow path for said fluid in heat exchange relationship with said surface while maintaining said exothermic fluid inert to exothermic reaction thereof, said fluid being one which undergoes an endothermic chemical reaction when heat is added thereto to form an endothermic fluid, whereby at least part of said exothermic fluid is converted to said endothermic fluid as heat is withdrawn from said surface, and passing said endothermic fluid from a downstream region of said flow path out of heat exchange relationship with said surface.

13. A method for withdrawing heat from a heated surface comprising the steps of passing an exothermic fluid from an upstream region of a flow path in heat exchange relationship with said surface, said fluid being one which undergoes an endothermic chemical reaction when in the presence of a catalyst for accelerating said reaction and when said fluid is heated to above a predetermined temperature for reaction in the presence of said catalyst to form said endothermic fluid, said surface being at a temperature above said predetermined temperature at which said exothermic fluid is reactive in the presence of said catalyst to form said endothermic fluid, contacting said exothermic fluid with said catalyst during passage of said exothermic fluid along said flow path whereby at least part of said exothermic fluid is converted to said endothermic fluid as heat is withdrawn from said surface, and passing said endothermic fluid from a downstream region of said flow path out of heat exchange relationship with said surface.

14. A method for withdrawing heat from a heated surface to maintain the surface at a safe operating temperature, the method employing an equilibrium system of a reversible chemical reaction, said reversible chemical reaction comprising an endothermic reaction proceeding in one direction in which an exothermic fluid forms an endothermic fluid, and a reaction proceeding in an opposite direction in which said endothermic fluid forms said exothermic fluid, the method comprising the steps of passing an amount of said exothermic fluid from an upstream region of a flow path in heat exchange relationship with said surface whereby said reversible reaction proceeds at an increased rate in said one direction as heat is withdrawn by said fluid from said surface, and passing said endothermic fluid from a downstream region of said flow path out of heat exchange relationship with said surface.

15. A method for withdrawing heat from a surface of a device for flight, said surface being subject to becoming heated above a predetermined temperature when the device is in flight, the method comprising the steps of introducing an exothermic fluid at an initial temperature substantially below said predetermined temperature to an upstream region of a flow path for said fluid wherein said fluid will pass in heat exchange relationship with said surface, said fluid being one which when heated to said predetermined temperature will react to form an endothermic fluid, passing said endothermic fluid along said path whereby heat is withdrawn by said exothermic fluid from said surface and at least part of said exothermic fluid is converted to said endothermic fluid, and passing said endothermic fluid from a downstream region of said flow path out of heat exchange relationship with said surface.

16. The method of claim 15 in which said surface is the inside surface of an outer skin of said device, said outer skin being aerodynamically heated when said device is in flight.

17. The method of claim 15 in which said surface is the inside surface of a hollow blade of a turbine.

18. The method of claim 15 in which said surface is a surface of a space rocket.

19. The method of claim 18 in which said surface is the outside surface of a fuel combustion chamber of a rocket motor.

20. A method for withdrawing heat from a surface of a device for flight, said surface being subject to becoming heated above a predetermined temperature when the device is in flight, the method utilizing an equilibrium system of a reversible chemical reaction, said reversible chemical reaction comprising an endothermic reaction proceeding in one direction in which an exothermic fluid forms an endothermic fluid, and a reaction proceeding in an opposite direction in which said endothermic fluid forms said exothermic fluid, the method further utilizing a catalyst for accelerating said reaction in said one direction when said exothermic fluid is heated to said predetermined temperature, the method comprising the steps of introducing said exothermic fluid at a temperature below said predetermined temperature to an upstream region of a flow path for said fluid wherein said fluid will pass in heat exchange relationship with said surface, passing said exothermic fluid along said path and contacting said exothermic fluid with said catalyst during passage of said exothermic fluid along said path, whereby heat is withdrawn by said exothermic fluid from said surface and at least part of said exothermic fluid is converted to said endothermic fluid, and passing said endothermic fluid from a downstream region of said flow path out of heat exchange relationship with said surface.

21. The method of claim 20 in which said exothermic fluid is cyclohexane and said endothermic fluid is benzene and hydrogen.

22. The method of claim 20 in which said exothermic fluid is ethane and said endothermic fluid is ethylene and hydrogen.

23. The method of claim 20 in which said exothermic fluid is ethanol and said endothermic fluid is ethylene and water.

24. In a structure requiring the removal of heat to maintain a part of the structure at a safe operating temperature, said part having a surface which is subject to being heated above said temperature, the combination comprising means defining a fluid flow path for passing an exothermic fluid in heat exchange relationship with said surface, said means having an upstream inlet formed therein for introducing a fluid to said flow path and having a downstream outlet for discharging fluid from said path, a source of said exothermic fluid free of reacting substances in a concentration which would cause said exothermic fluid when heated to react exothermically, said exothermic fluid being one which when heated to said safe operating temperature undergoes an endothermic chemical reaction to form an endothermic fluid, said flow path being closed except for said outlet and said inlet, said inlet being the sole access for incoming fluid entering said flow path, a catalyst for accelerating endothermic reaction of said exothermic fluid, and means for passing said exothermic fluid into said inlet and for causing fluid flow through said path while in contact with said catalyst whereby said endothermic fluid is discharged from said outlet.

25. In a structure according to claim 24 in which said structure is a device for flight, said part is an outer skin of said device and said surface is the inside surface of said outer skin.

26. In a structure requiring the removal of heat to maintain a part of the structure at a safe operating temperature and utilizing an equilibrium system of a reversible chemical reaction, said reversible chemical reaction comprising an endothermic reaction proceeding in one direction in which an exothermic fluid forms an endothermic fluid and a reaction proceeding in an opposite direction in which said endothermic fluid forms said exothermic fluid, said part having a surface which is subject to being heated above said temperature, the combination comprising means defining with said surface a fluid flow path for passing said exothermic fluid in heat exchange relationship with said surface, said means having an upstream inlet formed therein for introducing said exothermic fluid to said flow path and having a downstream outlet for discharging said endothermic fluid from said path, a source of said exothermic fluid free of reacting substances in a concentration which would cause said exothermic fluid when heated to react exothermically, a catalyst in said flow path for accelerating said reaction in said one direction when said exothermic fluid is heated to proximate said safe operating temperature, said flow path being closed except for said outlet and said inlet, said inlet being the sole access for incoming fluid entering said flowth path, and means for passing said exothermic fluid into said inlet and for causing fluid flow through said path whereby said endothermic fluid is discharged from said outlet.

References Cited in the file of this patent

UNITED STATES PATENTS

| | | |
|---|---|---|
| 1,828,784 | Perrin | Oct. 27, 1931 |
| 2,586,025 | Godfrey | Feb. 19, 1952 |
| 2,625,007 | Truax | Jan. 13, 1953 |
| 2,655,786 | Carr | Oct. 20, 1953 |
| 2,783,613 | Von Zborowski | Mar. 5, 1957 |
| 2,943,828 | Van Driest | July 5, 1960 |

FOREIGN PATENTS

| | | |
|---|---|---|
| 1,171,714 | France | Oct. 6, 1958 |